United States Patent
Block

(10) Patent No.: US 10,617,488 B2
(45) Date of Patent: Apr. 14, 2020

(54) DENTAL PROSTHESIS, APPARATUS AND KIT

(71) Applicant: Douglas Block, Manalapan, NJ (US)

(72) Inventor: Douglas Block, Manalapan, NJ (US)

( * ) Notice: Subject to any disclaimer, the term of this patent is extended or adjusted under 35 U.S.C. 154(b) by 639 days.

(21) Appl. No.: 14/721,310

(22) Filed: May 26, 2015

(65) Prior Publication Data

US 2015/0335396 A1 Nov. 26, 2015

Related U.S. Application Data

(60) Provisional application No. 62/002,598, filed on May 23, 2014.

(51) Int. Cl.
| | |
|---|---|
| *A61C 3/16* | (2006.01) |
| *A61C 7/02* | (2006.01) |
| *A61C 8/00* | (2006.01) |
| *A61C 13/01* | (2006.01) |

(52) U.S. Cl.
CPC ............... *A61C 3/162* (2013.01); *A61C 3/16* (2013.01); *A61C 7/02* (2013.01); *A61C 8/0095* (2013.01); *A61C 13/01* (2013.01)

(58) Field of Classification Search
CPC .. A61C 7/06; A61C 7/023; A61C 7/02; A61C 3/16; A61C 3/162; A61C 8/0095; B25F 1/00
USPC .......................................................... 7/161
See application file for complete search history.

(56) References Cited

U.S. PATENT DOCUMENTS

| | | | | |
|---|---|---|---|---|
| 618,324 | A * | 1/1899 | Blum | A61C 1/0007 173/127 |
| 927,420 | A * | 7/1909 | Flyer | A61C 3/16 433/151 |
| 948,484 | A * | 2/1910 | Snow | A61C 3/16 433/151 |
| 1,001,638 | A * | 8/1911 | Gubitz | A61C 3/16 433/151 |
| 1,606,686 | A * | 11/1926 | Barry | A61C 3/14 433/141 |
| 2,337,971 | A * | 12/1943 | Caviglia | A61C 3/16 433/151 |
| 2,602,998 | A * | 7/1952 | Sprague | A61C 3/14 433/141 |
| 2,776,490 | A * | 1/1957 | Carfagni | A61C 3/16 433/151 |
| 3,078,856 | A | 2/1963 | Bender et al. | |
| 3,686,756 | A * | 8/1972 | Pankratz | A61C 3/16 433/151 |

(Continued)

OTHER PUBLICATIONS

Written Opinion in corresponding PCT/US15/032388.

*Primary Examiner* — Sean M Michalski
*Assistant Examiner* — Shannel N Wright
(74) *Attorney, Agent, or Firm* — Van Dyke Law; Raymond Van Dyke

(57) ABSTRACT

A device for to aid or help patients remove dental prostheses. The dental prosthesis removal tool preferably includes a small hook, which has a rubber cover. The hook is preferably attached to a bar and a handle, which could easily fit into a patient's hand. The tool is preferably made of a strong, rust free metal, e.g. stainless steel. The handle is preferably made of a hard, processed plastic, and is strongly secured to the bar. A kit of the components is also envisioned.

20 Claims, 4 Drawing Sheets

(56) References Cited

U.S. PATENT DOCUMENTS

| | | | |
|---|---|---|---|
| 3,702,028 A * | 11/1972 | Edelman | A61C 8/0089 433/150 |
| 3,861,045 A | 1/1975 | Canter et al. | |
| 4,167,063 A * | 9/1979 | Sosnay | A61C 7/02 433/3 |
| 4,300,885 A * | 11/1981 | Khait | A61C 3/16 433/121 |
| 4,449,935 A * | 5/1984 | Harris | A61C 3/16 433/151 |
| 4,975,051 A | 12/1990 | Kargas et al. | |
| 5,100,321 A * | 3/1992 | Coss | A61C 3/03 433/118 |
| 5,217,371 A * | 6/1993 | Lukase | A61C 3/16 433/141 |
| 5,378,151 A * | 1/1995 | Lukase | A61C 3/16 433/141 |
| 5,496,172 A * | 3/1996 | Albelda | A61C 3/16 433/120 |
| 5,545,038 A * | 8/1996 | Beebe | A61C 3/16 433/120 |
| 6,361,317 B1 * | 3/2002 | Rahman | A61C 3/00 433/141 |
| 6,494,715 B1 * | 12/2002 | Riebl | A61C 5/62 433/164 |
| 6,840,768 B1 * | 1/2005 | Rabal | A61C 3/16 433/159 |
| 6,997,709 B2 * | 2/2006 | Kangasniemi | A61C 3/00 433/147 |
| 7,004,051 B1 * | 2/2006 | Orner | E05B 19/20 81/15.9 |
| 7,381,054 B1 * | 6/2008 | Polanowski | A61C 3/16 294/187 |
| 8,062,030 B2 * | 11/2011 | Saubers | A61C 7/02 433/141 |
| 8,167,612 B2 * | 5/2012 | DeSanti | A61C 7/02 433/141 |
| 8,182,266 B2 * | 5/2012 | Creasman | A61C 3/00 29/270 |
| 8,475,166 B1 * | 7/2013 | LaMee | A61C 3/00 433/141 |
| D715,437 S * | 10/2014 | Busch | D24/147 |
| 9,254,159 B2 * | 2/2016 | Li | A61B 17/8866 |
| 10,307,223 B1 * | 6/2019 | Aronson | A61C 7/023 |
| 2009/0246732 A1 * | 10/2009 | Creasman | A61C 7/02 433/141 |
| 2009/0286199 A1 * | 11/2009 | Creasman | A61C 3/00 433/141 |
| 2010/0281621 A1 * | 11/2010 | Moritz | B25B 13/06 7/147 |
| 2011/0045429 A1 * | 2/2011 | Rossi, III | A61C 3/00 433/25 |
| 2011/0060376 A1 * | 3/2011 | Li | A61B 17/8866 606/86 R |
| 2012/0009542 A1 * | 1/2012 | Keddington | A61C 3/00 433/75 |
| 2012/0189970 A1 * | 7/2012 | DeSanti | A61C 7/02 433/3 |
| 2013/0230817 A1 * | 9/2013 | Kabbani | A61C 7/14 433/3 |

\* cited by examiner

DENTAL PROSTHESIS, APPARATUS AND KIT

CROSS REFERENCE TO PRIORITY APPLICATION

The present invention claims priority to U.S. Provisional Patent Application No. 62/002,598, filed May 23, 2014, the contents of which are incorporated here in their entirety by reference.

FIELD OF THE INVENTION

The present invention is directed to improvements in dentistry, dental care and elder and other care involving the teeth and gums.

BACKGROUND OF INVENTION

Dental hygiene is a mainstay and a strong indicator of overall health. Thus, the daily maintenance of healthy teeth and gums is important. However, the loss or compromise of the health of the teeth and/or gums remains a problem to this day, despite the extraordinary advances in the dental and medical technologies. Since the human body does not grow new teeth upon loss, the usage of false or artificial teeth is quite common.

Dental implants have become widespread in dentistry. Implants are being used on edentulous patients (those missing all of their teeth) to help secure full dentures, as well as partial dentures, implants, bridges, restorations, etc. Implant-supported dentures eliminate slipping and movement so the patient has increased comfort and confidence while eating and speaking. The retention of dentures relies on surface tensions and such forces, caused by the close approximation of dental surfaces to the gum surfaces, i.e., the better the topographical fit of the artificial to the natural surfaces, the better the holding or suction properties of the denture or dental appliance, generating a good appliance to mimic the chewing, biting and other large mouth forces at play. As such, it generally takes significant forces to overcome these holding forces and remove the appliance. Furthermore, the holding forces can be augmented by adhesives and structures, such as wires to further grip the appliance and secure it to the mouth.

Because of the increased retention of implant-supported dentures, elderly patients who have weakness in their hands have difficulty removing these dentures or appliances. Dentists instruct their patients as to the proper placement of fingers to remove these devices, e.g., to place their fingers on the edge of the dentures and push until the denture becomes unseated, thereby overcoming the surface tensions and other forces. With elderly and other patients having cognitive difficulties, however, they are often unable to handle these procedures, despite repeated training. In addition, caregivers for the elderly and other patients also can have difficulty removing these dentures or appliances.

Of course, with people living longer and, as noted, with longevity correlated to dental health, there is a growing need for a device and/or technique to ameliorate this problem, giving individuals and caregivers a means to safely and easily remove dental appliances, such as dentures.

There is, therefore, a present need to provide a device or prosthesis to improve existing procedures and make dental prosthesis removal more efficient.

It is, therefore, an object of the present invention to provide a needed tool for dental professionals to employ to remove prostheses from the mouths of patients, and for patients to remove the prosthesis themselves.

SUMMARY OF THE PRESENT INVENTION

The present invention is directed to an aid to help patients remove dental prostheses. The dental prosthesis removal tool preferably includes a small hook, which has a rubber cover. The hook is preferably attached to a bar and a handle, which could easily fit into a patient's hand. The tool is preferably made of a strong, rust free metal, e.g. stainless steel. The handle is preferably made of a hard, processed plastic, and is strongly secured to the bar. The apparatus can also come as part of a kit.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

The present invention is, as noted, generally directed to an improved apparatus and technique to facilitate a dental patient or another with the removal of a dental or other prosthesis, e.g., that are securely affixed to the human body, such as in the mouth.

Figure 1:
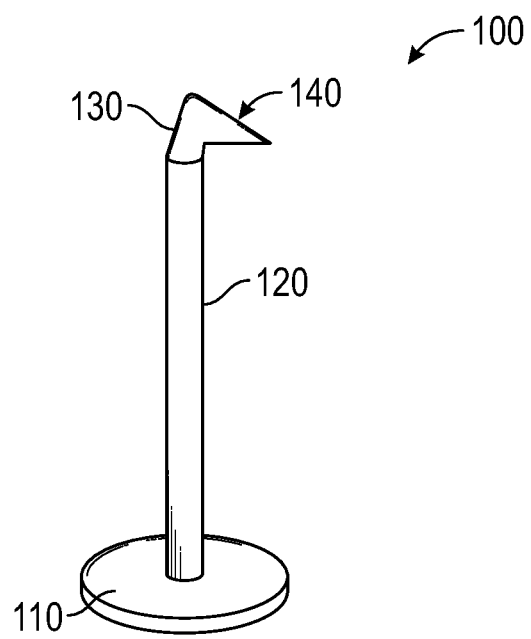
FIG. 1 is a representative view of a dental prosthesis removal apparatus employing the principles of the present invention in an exemplary configuration.

With reference now to FIG. 1 of the DRAWINGS, there is illustrated a representative configuration of a dental device or prosthesis for practicing the principles of the present invention, generally designated by the reference numeral 100. The prosthesis 100 has a handle portion, generally designated by the reference numeral 110, which is preferably comprised of a plastic material, as described in more detail hereinbelow in connection with FIG. 7, which the user of the tool 100 grips in practicing the invention. Also shown is a central shaft, generally designated by the reference numeral 120, which is securely affixed at one end to said handle portion 110, for example, to a central part of said handle portion 110, as illustrated.

Additionally, as shown in FIG. 1, the other end of said shaft 120 is covered by a rubber tip, generally designated by the reference numeral 130, which is affixed to or covers said shaft 120. As shown, at the end of the shaft 120 is a hook portion, generally designated by the reference numeral 140. As further shown, the rubber tip 130 is configured to cover the upper part of the shaft 120 and the hook portion 140. It should be understood that the hook portion 140 may be integral to the shaft 120, i.e., of the same constituency and perhaps, after casting or other formation, bent into the hook shape as shown. It should also be understood that the hook portion 140 may be affixed to the terminal end of the shaft 120, such as by screws engaging threads, glue or other means of affixation, as are understood to those of skill in the art.

It should be understood that the rubber tip 130 is intended to protect the soft tissues and surfaces within the mouth, covering the hard and perhaps sharp surfaces of the shaft 120 and the hook 140 affixed thereto. It should also be understood that the device 100 is of sufficient size and length so that the user thereof may grasp the handle 110, maneuver the shaft 120 and the hook 140, with the rubber tip 130 thereon, into position over the gums or sensitive tissues of the mouth, and situate the hook 140, between the gums and edge of the dental appliance or denture. With the hook 140 so positioned under the denture, the user may then pull on the device 100 to dislodge the denture from the mouth.

Thus, the technique for the use of the prosthesis 100 pursuant to the present invention is straightforward. Yet, all prior art devices and prostheses do not address the problem facing millions of people across the world: easy extraction of dentures and other dental and other apparatus from the mouth. The present invention solves this serious problem by placing the hook 140 on the back edge of the prosthesis, such as a denture in the mouth, thereby engaging the device for removal. Thus, for example, with an upper denture, the patient will pull the hook 140 down, thereby removing that denture. For a lower denture, the patient will position the device 100 differently and pull the hook 140 up.

It should thus be understood that the users of the tool, device or prosthesis 100 may employ the technique described to unseat a denture or other apparatuses in the mouth. It should, of course, be understood that alternative, non-oral usages are contemplated by the instant invention.

For example, other apparatuses employed in the body may need the advantages of the present invention for removal, e.g., a hip or other body part replacement requiring force to remove the device from among sensitive tissues.

Another area of possible usage of the present invention is in the area of orthodontics. Many adult patients are now using Invisalign for orthodontic treatment. This treatment consists of clear aligners that fit perfectly around all the teeth. These aligners are worn all the time, except while eating and teeth brushing. As with the dentures and other appliances discussed hereinabove, however, patients with poor dexterity can likewise have difficulties removing these aligners. The present invention can help those patients remove these aligners. In addition, conventional partial dentures that have metal clasps can at times be difficult for patients to remove. This tool can help patients remove partial dentures also.

It should, of course, be understood that the handle 110 may also be comprised of a variety of plastic materials that have sufficient strength for the extraction. Also, the handle 110 is preferably of a shape or configured so that users may easily grasp the handle 110 and pull, as described and illustrated in more detail hereinbelow. For example, the handle 110 may be formed into a T-bar shape, making the handle 110 easily grasped by a human hand, as illustrated and described in more detail in connection with FIG. 7 of the DRAWINGS. The exemplary handle portion 110 configuration in FIG. 1 is thus merely exemplary and other configurations are possible.

Figure 2:
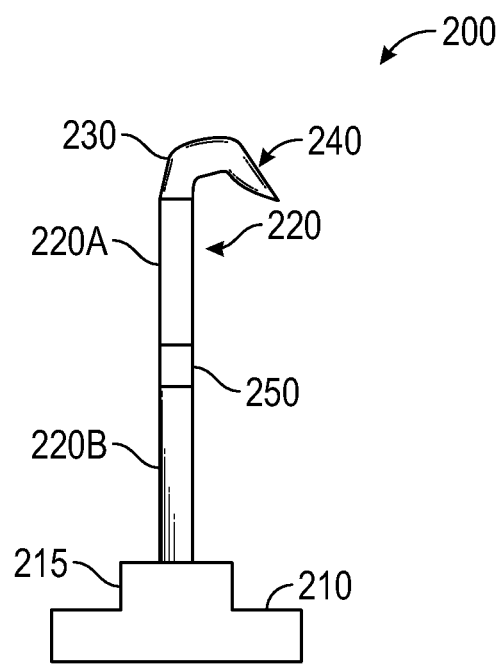
FIG. 2 is a representative view of a dental prosthesis removal apparatus employing the principles of the present invention in another configuration.

With reference now to FIG. 2 of the DRAWINGS, there is illustrated another representative configuration of a dental device or prosthesis for practicing the principles of the present invention, generally designated by the reference numeral 200. The prosthesis 200 has a handle portion, generally designated by the reference numeral 210, which is preferably comprised of a plastic material, as described, and formed in a configuration easily grasped by a user. Also shown is a central shaft, generally designated by the reference numeral 220, which is securely affixed at one end to said handle portion 210, for example, to a central columnar part 215 of said handle portion 210, as illustrated. Additionally, at the other end of said shaft 220 is a rubber tip, generally designated by the reference numeral 230, which is affixed to or covers the aforesaid other end of the shaft 220 and a hook portion 240, which is attached to the shaft 220, as described hereinabove. As discussed, the rubber tip 230 extends over those portions of the device 200 that come into contact with the mouth, such as the upper portion of the shaft 220 and the hook 240, as illustrated.

For patients who cannot easily remove the denture, an alternative design of the instant invention involves spring loading the prosthesis, as also shown in FIG. 2. The bar or shaft 220 in this embodiment, for example, would preferably be in two sections, generally designated by the reference numerals 220A and 220B, respectively, and attached to each other by an internal spring, generally designated by the reference numeral 250. When the tool 200 is activated, the two bars 220A and 220B would be quickly separated by a small gap, such as 5 mm, by the springs 250. Thus, the patient places the hook 240 on the edge of the denture, as described, pulls down and then presses a button or lever, as generally designated by the reference numeral 260, on the tool 200 to tighten (or release) the spring. This 5 mm displacement, such as by the spring 250 release, will unseat the denture.

Furthermore, it should be understood that the shaft 120/220 be made of a strong material, preferably metal, preferably stainless steel, the material of choice for most medical and dental apparatus. As indicated, the shaft 120/220 must be securely affixed to the handle 110/210. Of course, this affixation can be done in a variety of ways, e.g., one end of the shaft 120/220 may have a threaded portion to engage threads within the handle 110/210, thereby affixing the two components. It should, of course, be understood that alternative affixation techniques are possible also, such as glue and other bonding means. It should also be understood that the handle 110/210 and the shaft 120/220 may be of integral construction, or affixed, as illustrated and described.

As indicated, the rubber tip 130/230 must also affix to the shaft 120/220, as well as the aforesaid curved parts of the hook 140/240. In a preferred embodiment, one end of the rubber tip 130/230 is hollow and configured to cover the other end of the shaft 120/220. In this manner, the rubber tip 130/230 can be easily removed if necessary. However, ease of removal is counter to the goal of the invention, i.e., to engage and remove devices in the moorings where they have become affixed. Thus, the tightness of the fit of the rubber tip 130/230 over the other end of the shaft 120/220 must be great.

As indicated, the rubber tip 130/230 covers a hook portion 140/240 at the aforesaid other end of the shaft 120/220. As with the entire device 100/200, the hook 140/240 must be sufficiently resilient to engage a denture edge and have sufficient strength so that a user may pull or yank the denture out with that hook 140/240. As such, the rubber tip 130/230 is preferably made of a somewhat flexible but durable and resilient material, preferably one that is acceptable for insertion into the mouth. It should, therefore, be understood that the hook portion 140/240 of the shaft, as well as the shaft 120/220, must be made of a resilient, rigid yet somewhat flexible material, which can withstand the necessary forces in removal and also retain its shape. As such the shaft 120/220 and the attached or integral to the hook portion 140/240 thereof, although preferably of stainless steel or like construction, can also be made of a hard plastic or any like rigid material that would allow the structure to retain their shape despite the forces necessary to be applied for denture or appliance removal.

Further, as discussed, the ends of the devices 100/200 that come into contact with the teeth or mucosa of the mouth are preferably covered by rubber or like softer materials that cover or overlay the more rigid or resilient materials discussed hereinabove, thereby cushioning the application of the tool.

It should be understood that a variety of configurations for the prosthesis are possible so that the device will substantially conform to the intended usages, as well as custom configurations. The embodiments shown in FIGS. 1 and 2 illustrate but a few of the techniques of a prosthetic removal device pursuant to the teachings of the present invention.

It should also be understood that the hook 140/240 of the rubber tip 130/230 may be configured in a variety of formats, so long as the rubber tip 130/230 affixes firmly to the shaft 120/220, as described. It should be understood that the rubber tip 130/230 may comprise two such tips, one as a sleeve to cover or overlay the end of the shaft 120/220, and another to cover or overlay the end of the hook 140/240, where the two covers may overlap, as illustrated in FIG. 3.

Figure 3:
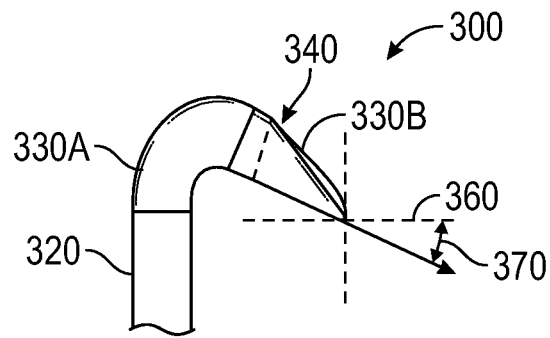
FIG. 3 illustrates a hook portion of a dental prosthesis removal apparatus employing the principles of the present invention, such as shown in the configurations illustrated and described in connection with FIGS. 2 and 3.

With reference now to FIG. 3 of the DRAWINGS, there is illustrated the engagement end of the shaft 120/220 of the present invention, generally designated by the reference numeral 320, for another device, generally designated by the reference numeral 300. A rubber sleeve, generally designated by the reference numeral 330A, is slipped over a hook portion 340 of the shaft 320, and covers the top portion of the shaft 320, as shown. A rubber tip, generally designated by the reference numeral 330B, is also slipped over the hook portion 340, and covers the end of the hook portion 340, along with some of the rubber sleeve 330A.

It should also be understood that the hook portion may be configured differently. For example, the hook 140/240/340, as shown in these embodiments of the present invention, has an angle of about 30-45 degrees. As shown in FIG. 3, the angle of direction of the hook from a horizontal line at the tip of the hook 340, generally designated by the reference numeral 360, is an angle, generally designated by the reference numeral 370, where this angle is about 30-45 degrees in the examples set forth hereinabove. It should, of course, be understood that alternative angles may also be employed in practicing the principles of the present invention, i.e., grasping the internal dental appliances for removal.

Accordingly, it be understood that sharper angles are also contemplated. For example, Applicant has found in his practice that in emergencies, a patient may use a crochet needle to help dislodge dentures and appliances. Although a bit perilous, the hook portion of the crochet needle can engage and unseat a denture, albeit quite unsafely. Thus, the hook portion pursuant to the teachings of the present invention may also be formed like a crochet hook or like configuration designed to best engage surfaces, as described in detail herein.

Figure 4:
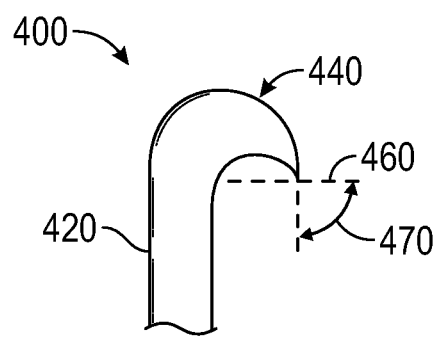
FIG. 4 illustrates another hook portion of a dental prosthesis removal apparatus employing the principles of the present invention in another configuration, as may be employed in the configurations illustrated and described in connection with FIGS. 2 and 3.

Accordingly, with reference now to FIG. 4 of the DRAWINGS, there is illustrated an end portion of a crochet needle-type ending on a device of the present invention, generally designated by the reference numeral 400, particularly the portion with the hook. It should be understood that instead of the long crochet needle, the hook portion, generally designated by the reference numeral 440, is attached to a shaft 420, which is likewise attached to a handle 110/210, as described. As discussed, the hook 440 in this embodiment of the present invention has an angle of about 90 degrees, i.e., the angle 470 from horizontal 460 is about 90 degrees.

It should be understood that the end of the hook 140/240/340/440, although shown as pointed in these embodiments, may instead be more rounded and smooth, such as often used in connection with a crochet hook. Since the intended theater of operation for the devices 100/200/300 of the present invention involve sensitive and delicate tissues, and since the aforementioned rubber tips 130/230/330 covering the harder surfaces may not prevent piercing, the dulling or smoothing of the various harder surfaces of the shaft 120/220/320 and hook 140/240/340 is an important consideration in the implementation of the present invention. Nonetheless, for ease of use in the field, the rubber tips 130/230/330 may be made sufficiently thick to overcome the sharp surfaces of the devices 100/200/300, providing a more universal solution.

Figure 5:
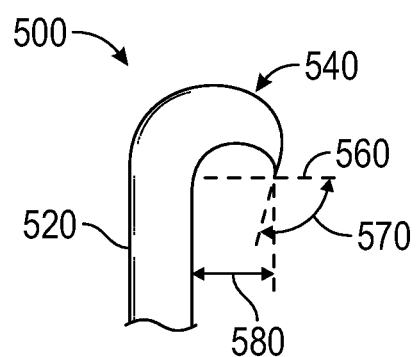
FIG. 5 illustrates hook portion of a dental prosthesis removal apparatus employing the principles of the present invention in another configuration, as shown in FIG. 4 but with a different hook configuration.

With reference now to FIG. 5 of the DRAWINGS, there is shown an embodiment like that shown and described in connection with FIG. 4, but with a sharper angle for the hook portion thereof, generally designated by the reference numeral 540. As shown in this embodiment, the angle 570 from horizontal 560 is about 110 degrees. It should, of course, be understood in these sharper angled configurations that the hook must have sufficient extension from the shaft so as to properly engage a denture or dental appliance. In other words, there must be a sufficient gap, generally designated by the reference numeral 580, to allow the hook 540 to engage. It should further be understood that this gap 580 may be increased by having a curved, flattened or tapered shaft, such as applied to the shaft 520 shown and described hereinabove.

Figure 6:
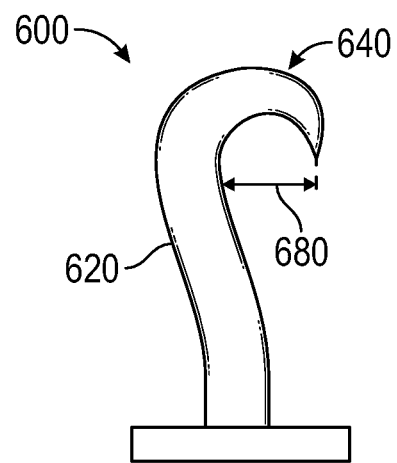
FIG. 6 illustrates hook portion of a dental prosthesis removal apparatus employing the principles of the present invention in yet another configuration, as shown in FIG. 4 but with a different hook configuration, with a curved shaft or hook portion.

With reference now to FIG. 6 of the DRAWINGS, there is shown an alternate embodiment of the present invention, generally designated by the reference numeral 600. As shown, the shaft 620 is curved, creating a larger arc for the hook portion 640, and a larger gap 680 than that of the embodiment shown and described in connection with FIG. 5.

Figure 7A:
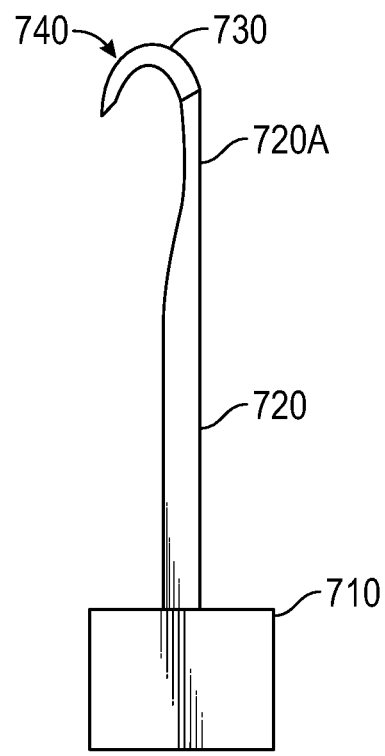
FIGS. 7A and 7B illustrate another configuration of the dental prosthesis removal apparatus pursuant to the teachings of the instant invention, with a tapering or flattened shaft and/or hook portion, and hand grip.
Figure 7B:
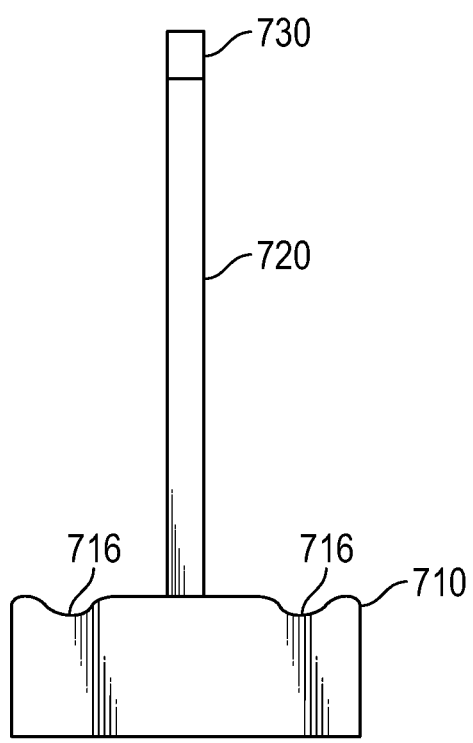

With reference now to FIGS. 7A and 7B of the DRAWINGS, there is shown an alternate embodiment of the present invention, generally designated by the reference numeral 700. As shown in FIG. 7A, a shaft 720 is affixed to a handle 710 at one end, and tapers at the other, i.e., the thickness of the shaft 720 goes, in this example, from about 5 mm to about 2 mm at a point 720A, with hook portion 740 staying at 2 mm or increasing to 3 mm until coming to the tip thereof. A shown in FIG. 7A, the aforementioned gap in this exemplary configuration is about 4 mm.

With reference now to FIG. 7B, the shaft 720 in this view does not taper in this dimension, with only the rubber tip 730 being visible on the shaft 720. Thus, in this embodiment of the present invention, the hook 740 flattens out, allowing a gripping surface to hook onto the denture for removal, as discussed. It should, of course, be understood that the device 700, as well as the other devices illustrated herein, may taper or flatten thusly along one dimension, or may also taper or flatten along a second dimension, e.g., the shaft 720 in FIG. 7B would taper in addition to the tapering shown in FIG. 7A.

With further reference to FIGS. 7A and 7B, it should be understood that the handle 710 also differs in size between the two views. For illustrative purposes, the handle 710 for the embodiment shown in FIGS. 7A and 7B may have dimensions of about 1.5 to 3 cm by 8-12 cm. As shown in FIG. 7B, the handle 710 has two finger grooves, generally designated by the reference numeral 716, by which the user my better grasp the device 700 for removal. It should, of course, be understood that although the dimensions and shapes of the finger grooves 716 may vary, they are contemplated as being within the scope of the present invention, as claimed.

As indicated, the range of hook angles for use in the aforementioned embodiments of the present invention range from about 30-45 degrees to about 110 degrees from horizontal. A preferred subrange is about 45 degrees to about 100 degrees, and a more preferred range is about 70 degrees to about 90 degrees.

Figure 8:
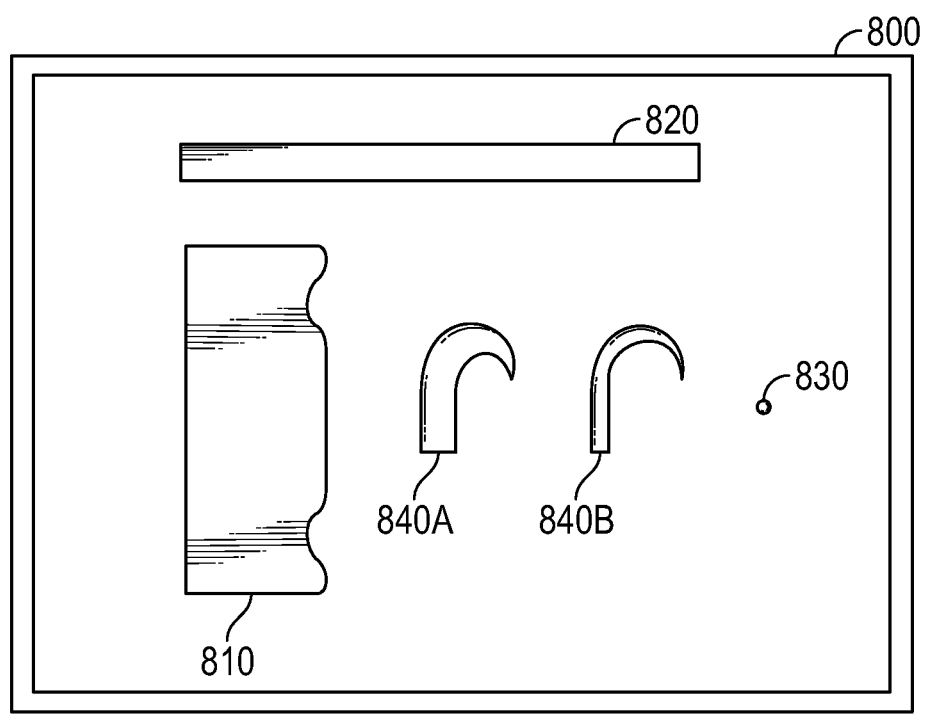
FIG. 8 illustrates a kit that may be employed in the implementation or practicing of the present invention, such as by a dentist or other medical professional, with the various components.

With reference now to FIG. 8 of the DRAWINGS, there is generally illustrated therein a kit that may be employed in practicing the present invention, as described herein and generally designated by the reference numeral 800. As shown, the kit 800, which may come in the form of a box or other enclosure, has a variety of components therein, including at least one shaft 820. It should be understood that the kit 800 may include a variety of shafts 820 of differing lengths, dimensions, taperings, etc. to facilitate the particular needs for a variety of patients, e.g., the elderly with dentures, children with braces, and so forth. Also shown is a handle 810, to which the shaft 820 may be affixed as described hereinabove, whether by mechanical or chemical means. Also shown are a variety of hook portions, generally designated by the reference numeral 840A and 840B, which again can be employed for differing patients and/or circumstances, and at least one rubber tip portion, generally designated by the reference numeral 830, which, as discussed in more detail and illustrated hereinabove, can be employed to soften the edges or points on the shafts 820 and hooks 840 in the kit 800.

It should, therefore, be understood that the instant invention in one embodiment is configured as a variety of interconnectable component parts, as shown and described at least in connection with FIG. 8, which allows a large degree of flexibility, such as for a dental practitioner, to care for a range of people. It should further be understood that in other embodiments of the present invention, described hereinabove, the entire device may be formed of hard plastic or metal, and sold as one fully-constituted device, such as where a consumer may buy them individually or in bulk for personal use. Whether used as part of a dental practice or employed at home, it should be understood that the improved dental appliance removal device of the present invention is useful in a variety of contexts.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A device for removing dental appliances from a patient mouth comprising:
   a handle;
   a shaft, said shaft being affixed to said handle at one end thereof;
   a hook, said hook being affixed at one end to a second end of said shaft,
   wherein said hook has a tip portion at an angle of about 30-110 degrees from a horizontal line, wherein said horizontal line is perpendicular to the axis of said shaft,
   whereby said device is adapted for a user employing said device to engage a dental appliance in said patient mouth, and said device is adapted to remove said dental appliance therefrom.

2. The device according to claim 1, wherein said handle is composed of a material selected from the group consisting of stainless steel, plastic material and rubber.

3. The device according to claim 1, wherein said handle comprises a plurality of finger grips for use in the removal of said dental appliance by said user.

4. The device according to claim 1, wherein said shaft is composed of a material selected from the group consisting of stainless steel, plastic material and rubber.

5. The device according to claim 1, wherein said shaft connects to said handle by threaded screw connectivity,
   wherein said shaft and said handle are capable of detaching.

6. The device according to claim 1, wherein said shaft connects to said handle by adhesion.

7. The device according to claim 1, wherein said shaft comprises at least one spring therein, wherein said at least one spring, upon activation, provides a force on said dental appliance.

8. The device according to claim 1, wherein said shaft has a tapering portion.

9. The device according to claim 1, wherein said handle and said shaft are integral.

10. The device according to claim 1, wherein said hook is composed of a material selected from the group consisting of stainless steel, plastic material and rubber.

11. The device according to claim 1, wherein said hook connects to said shaft by threaded screw connectivity, wherein said hook and said shaft are capable of detaching.

12. The device according to claim 1, wherein said hook connects to said shaft by adhesion.

13. The device according to claim 1, wherein said tip portion is at an angle of about 45-100 degrees from said horizontal line.

14. The device according to claim 13, wherein said tip portion is at an angle of about 70-90 degrees from said horizontal line.

15. The device according to claim 1, further comprising:
a rubber tip portion, said rubber tip portion covering at least a portion of said hook.

16. The device according to claim 15, wherein said rubber tip portion covers said hook.

17. The device according to claim 16, wherein said rubber tip portion covers a portion of said shaft.

18. A kit for removing dental appliances from a patient mouth comprising:
at least one handle;
at least one shaft, said at least one shaft capable of being affixed to said at least one handle at one end thereof;
a plurality of hooks, at least one of said plurality of hooks capable of being affixed at one end to a second end of said at least one shaft,
wherein said at least one of said plurality of hooks has a tip portion at an angle of about 30-110 degrees from a horizontal line, wherein said horizontal line is perpendicular to the axis of said at least one shaft,
said at least one handle, said at least one shaft and said at least one hook, upon assembly, forming a device,
wherein said plurality of hooks are each threadedly affixed to said at least one shaft,
whereby said device is adapted for a user employing said device to engage a dental appliance in said patient mouth, and said device is adapted to remove said dental appliance therefrom.

19. The kit according to claim 18 further comprising at least one rubber tip, said at least one rubber tip covering at least one of said plurality of hooks when inserting into said patient mouth.

20. The kit according to claim 18, wherein said tip portion is at an angle of about 45-100 degrees from said horizontal line.

* * * * *